(12) United States Patent
Davis et al.

(10) Patent No.: US 9,710,357 B2
(45) Date of Patent: Jul. 18, 2017

(54) FUNCTION EVALUATION USING LIGHTWEIGHT PROCESS SNAPSHOTS

(75) Inventors: Jackson Davis, Snohomish County, WA (US); Tae Hyung Kim, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 137 days.

(21) Appl. No.: 13/567,036

(22) Filed: Aug. 4, 2012

(65) Prior Publication Data

US 2014/0040897 A1 Feb. 6, 2014

(51) Int. Cl.
G06F 9/44 (2006.01)
G06F 11/36 (2006.01)
G06F 11/30 (2006.01)

(52) U.S. Cl.
CPC ........ *G06F 11/362* (2013.01); *G06F 11/3096* (2013.01); *G06F 11/366* (2013.01); *G06F 11/3636* (2013.01)

(58) Field of Classification Search
CPC ........................................ G06F 11/36–11/3696
USPC .................................................. 717/124–138
See application file for complete search history.

(56) References Cited

U.S. PATENT DOCUMENTS

| | | | | |
|---|---|---|---|---|
| 5,664,088 A * | 9/1997 | Romanovsky et al. | ........ | 714/13 |
| 6,094,530 A * | 7/2000 | Brandewie | ..................... | 717/127 |
| 6,195,676 B1 * | 2/2001 | Spix et al. | .................... | 718/107 |
| 6,671,825 B1 * | 12/2003 | Joshi et al. | ................. | 714/38.11 |
| 6,839,894 B1 * | 1/2005 | Joshi et al. | .................... | 717/130 |
| 6,988,264 B2 * | 1/2006 | Sarma | ................... | G06F 11/362 717/127 |
| 7,114,100 B2 * | 9/2006 | Hogdal et al. | .................. | 714/27 |
| 7,150,006 B2 * | 12/2006 | Bliss et al. | ..................... | 717/124 |
| 7,222,264 B2 * | 5/2007 | Muratori | ............... | G06F 11/362 714/33 |

(Continued)

OTHER PUBLICATIONS

Flashback: A Lightweight Extension for Rollback and Deterministic Replay for Software Debugging Sudarshan M. Srinivasan, Srikanth Kandula, Christopher R. Andrews and Yuanyuan Zhou—USENIX Annual 2004—https://www.usenix.org/legacy/events/usenix04/tech/general/full_papers/srinivasan/srinivasan_html/paper.html.*

(Continued)

*Primary Examiner* — Francisco Aponte
(74) *Attorney, Agent, or Firm* — Fogarty LLP

(57) ABSTRACT

A debugger creates a lightweight process snapshot of a debuggee target process and performs in-process or function evaluation (func-eval) inspection against the copy. This allows most state in the debuggee process to stay intact because changes made by the func-eval are local to the process snapshot. Debugger operations that are too destructive to the original debuggee process can be performed on the process snapshot without threatening the real process. Process snapshots allow the debugger to perform a func-eval while isolating the debuggee process and not losing the actual state of the original debuggee process. A new process snapshot of the debuggee process is created when the current snapshot is corrupt due to a func-eval side effect. The debugger may also use a lightweight machine snapshot of the host debuggee machine and perform func-evals against that machine snapshot to further isolate kernel and other side effects.

18 Claims, 6 Drawing Sheets

(56) References Cited

U.S. PATENT DOCUMENTS

| | | | |
|---|---|---|---|
| 7,360,115 B2* | 4/2008 | Hogdal et al. ............... 714/27 |
| 7,434,100 B2* | 10/2008 | Hogdal et al. ............... 714/27 |
| 7,434,229 B2* | 10/2008 | Barinov ........... G06F 17/30286 |
| | | | 707/999.201 |
| 7,587,635 B2* | 9/2009 | Pandharikar et al. ......... 714/27 |
| 7,647,589 B1* | 1/2010 | Dobrovolskiy et al. ......... 718/1 |
| 7,650,593 B2 | 1/2010 | Horton et al. |
| 8,090,989 B2* | 1/2012 | Law ................. G06F 9/3863 |
| | | | 714/35 |
| 8,166,477 B1* | 4/2012 | Tormasov ............ G06F 9/4418 |
| | | | 718/1 |
| 8,336,029 B1* | 12/2012 | McFadden ......... G06F 9/45516 |
| | | | 717/100 |
| 8,347,267 B2* | 1/2013 | Givoni ............... G06F 11/3414 |
| | | | 714/703 |
| 8,429,613 B2* | 4/2013 | Rosen ............... G06F 11/3624 |
| | | | 717/124 |
| 8,769,502 B2* | 7/2014 | Heidasch ............... G06F 11/36 |
| | | | 717/124 |
| 8,776,026 B2* | 7/2014 | Candea et al. ............... 717/126 |
| 8,776,028 B1* | 7/2014 | Enakiev ............ G06F 11/3664 |
| | | | 714/38.11 |
| 8,793,666 B2* | 7/2014 | Klinker ............... G06F 11/362 |
| | | | 717/135 |
| 8,843,895 B2* | 9/2014 | McFadden ......... G06F 9/45516 |
| | | | 717/100 |
| 8,909,990 B2* | 12/2014 | Davis ................. G06F 11/3636 |
| | | | 714/37 |
| 8,972,953 B2* | 3/2015 | Tamm ............... G06F 11/3644 |
| | | | 717/124 |
| 8,990,780 B2* | 3/2015 | Bates ............... G06F 11/3636 |
| | | | 717/129 |
| 9,009,679 B2* | 4/2015 | Bates ............... G06F 11/3624 |
| | | | 705/40 |
| 2002/0032804 A1* | 3/2002 | Hunt ................. G06F 8/443 |
| | | | 719/320 |
| 2002/0038437 A1* | 3/2002 | Hogdal et al. ............... 714/25 |
| 2002/0078404 A1* | 6/2002 | Vachon et al. ............... 714/38 |
| 2002/0087950 A1* | 7/2002 | Brodeur ............ G06F 11/3636 |
| | | | 717/124 |
| 2002/0174415 A1* | 11/2002 | Hines ............... 717/127 |
| 2003/0088752 A1* | 5/2003 | Harman ............... 711/202 |
| 2003/0204778 A1* | 10/2003 | Wilding et al. ............... 714/19 |
| 2004/0221269 A1* | 11/2004 | Ray et al. ............... 717/124 |
| 2005/0050389 A1* | 3/2005 | Chaurasia ............... 714/15 |
| 2005/0071824 A1* | 3/2005 | K. N. et al. ............... 717/138 |
| 2007/0113218 A1* | 5/2007 | Nolan et al. ............... 717/124 |
| 2007/0180217 A1 | 8/2007 | Raymond et al. |
| 2007/0288902 A1* | 12/2007 | Lev et al. ............... 717/124 |
| 2008/0209422 A1* | 8/2008 | Coha ............... 718/102 |
| 2008/0295077 A1* | 11/2008 | Sengupta ............ G06F 11/0748 |
| | | | 717/124 |
| 2008/0295078 A1* | 11/2008 | Stall et al. ............... 717/125 |
| 2009/0089560 A1* | 4/2009 | Liu et al. ............... 712/226 |
| 2009/0183154 A1 | 7/2009 | Miskelly et al. |
| 2009/0271472 A1* | 10/2009 | Scheifler ............... G06F 9/485 |
| | | | 709/202 |
| 2009/0307528 A1* | 12/2009 | Byers et al. ............... 714/32 |
| 2010/0162212 A1* | 6/2010 | Stall et al. ............... 717/124 |
| 2010/0251031 A1* | 9/2010 | Nieh et al. ............... 714/45 |
| 2012/0047493 A1* | 2/2012 | Ashish ............ G06F 11/3636 |
| | | | 717/129 |
| 2012/0096441 A1* | 4/2012 | Law et al. ............... 717/127 |
| 2013/0139128 A1* | 5/2013 | Jones et al. ............... 717/128 |
| 2013/0346814 A1* | 12/2013 | Zadigian et al. ............ 714/724 |

OTHER PUBLICATIONS

Flashback: A Lightweight Extension for Rollback and Deterministic Replay for Software Debugging Sudarshan M. Srinivasan, Srikanth Kandula, Christopher R. Andrews and Yuanyuan Zhou—USENIX Annual 2004—https://www.usenix.org/legacy/events/usenix04/tech/general/full_papers/srinivasan/srinivasan-html/paper.htm.*

"International Search Report & Written Opinion for PCT Patent Application No. PCT/US2013/053111", Mailed Date: Nov. 7, 2013, Filed Date: Aug. 1, 2013, 11 Pages.

Stall, Mike, "Func-Eval is Evil—Mike Stall's .NET Debugging Blog—Site Home—MSDN Blogs", Published On: Mar. 23, 2005, http://blogs.msdn.com/b/jmstall/archive/2005/03/23/400794.aspx.

Hursey, et al., "Checkpoint/Restart-Enabled Parallel Debugging", In Proceedings of the 17th European MPI Users' Group Meeting Conference on Recent Advances in the Message Passing Interface, Sep. 12, 2010, 10 Pages.

Plank, et al., "Memory Exclusion: Optimizing the Performance of Checkpointing Systems" In Journal of Software—Practice & Experience, vol. 29, Issue 2, Feb. 1, 1999, 18 Pages.

Strein, Dennis et al., "Design and Implementation of a high-level multi-language .NET Debugger," The 3rd International Conference on .NET Technologies, 2005 (downloaded from: http://dotnet.zcu.cz/NET_2005/Papers%5CFull%5CA83-full.pdf), May 31, 2005, pp. 57-64.

MSDN, "CLR Debugging Overview—.NET Framework 4," (downloaded from: http://msdn.microsoft.com/en-us/library/bb397953.aspx. on Apr. 19, 2012), 2012, (8 pages).

Lee, Byeongcheol, "Debug All Your Code: Portable Mixed-Environment Design," Conference on Object-Oriented Programming, Systems, Languages, and Applications (OOPSLA), 2009, (downloaded from: https://www.cs.utexas.edu/~bclee/papers/blink-oopsla-2009.pdf), Oct. 25-29, 2009, pp. 207-226.

SIPO "Notice of the First Office Action" and "Search Report" issued in Chinese Patent Application No. 201380041514.5, Mailed Date: Jun. 13, 2016, 13 Pages.

"Second Office Action and Search Report Issued in Chinese Patent Application No. 201380041514.5", Mailed Date: Feb. 20, 2017, 12 pages.

* cited by examiner

FUNCTION EVALUATION USING LIGHTWEIGHT PROCESS SNAPSHOTS

BACKGROUND

The inspection of process state in a debugger has traditionally used one of two approaches: out-of-process inspection and in-process inspection. In out-of-process inspection, the debugger obtains the values of variables by reading debuggee memory or by consuming debuggee context. For in-process inspection, the debugger evaluates properties by actually executing property functions within the debuggee process. This in-process inspection is called function evaluation or "func-eval" in debugger parlance. Both approaches have advantages and disadvantages.

In an out-of-process inspection model, the debugger cannot corrupt the state of the debuggee. The developer sees a raw view of the debuggee state, which tends to be at a lower level than the abstraction the API designer intended. This is because the debugger can only obtain the backing values of a property if they are accessible in debuggee memory. For instance, if a property's value is calculated, the debugger can only show the raw variables used in the calculation.

Properties with values that depend on state outside the debuggee's memory, such as state shared with other processes (either in memory or on a storage media), state from some other connected device, removable storage, etc., cannot be read in this manner. Other state-dependent values that cannot be read in this way are states in the operating system kernel or cross-machine implemented states. The out-of-process model requires the developer to reverse engineer the implementation of the API abstraction from the values available as raw variables, which can be difficult, confusing, or impossible to do.

For the in-process or func-eval model, the developer sees the exact view of the abstraction the API designer intended. No mapping from implementation to public view is necessary. However, in a func-eval model, any side effects for the implementation of the property will affect debuggee state, which may lead to developer confusion and incorrect debuggee behavior. The debuggee may not be in a state where code can be executed, such as highly stressed processes that are near out-of-memory situations or threads within the process that have entered the kernel. In this state, debugger inspection is impossible. Executing a function-evaluation can lead to debuggee deadlock or corruption. Specifically if the implementation of a property depends other threads executing. For instance, if a property tries to take a lock held by another thread, that property cannot execute unless the thread that holds the lock releases it, leading to deadlock.

Furthermore, in the proxy/stub model used by some distributed environments, the call may require multiple threads to execute in order to enable another thread to "pump" or handle an incoming call from another thread that is doing a func-eval. Allowing the other threads in the process to run (i.e. "slipping the threads") is something the debugger generally cannot allow because the actual execution point for every thread would change on each func-eval. Such cross-context calls can lead to un-recoverable corruption of the debuggee if they do not complete correctly.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Using lightweight process snapshot support in the operating system, the debugger creates a copy of the debuggee target process and performs func-eval inspection against the copy. This leaves most debuggee state in the target process intact since any changes made by the func-eval are local to the snapshot copy. Any catastrophic failures during func-eval, such as dead-locking the debuggee process, have minimal impact because the original process remains untouched and the snapshot can simply be thrown away and recreated. Debugger operations that would be too destructive to the debuggee process can be performed on the process snapshot without threatening the real process. For example, slipping all threads during a func-eval is one such scenario.

Slipping all threads is required, for example, in distributed environments where calls between objects may traverse thread boundaries, such as Single-Threaded Apartments in COM. Performing a normal func-eval on such an object will deadlock—and possibly corrupt—the debuggee process because the target thread will not be running. However, allowing all threads to run ("slip") means that the state of the process may be drastically changed after the func-eval is complete. Furthermore, important debugger events such as breakpoints or exceptions, which occur on slipping threads, are likely to be ignored since the debugger will not want to enter break state at that point. Process snapshots allow the debugger to perform a func-eval while slipping all threads and not lose the actual state of the original debuggee process.

The debugger uses lightweight process snapshots to isolate side-effects of func-evals. The debugger may also create new lightweight process snapshots of the target debuggee process when a func-eval side effect no longer reflects the target process or a snapshot becomes so corrupt it can no longer be used.

In one embodiment, a debugger uses a lightweight process snapshot of a target debuggee process and performs func-evals against that snapshot. The debugger uses lightweight process snapshots of the target debuggee process for the func-eval. The debugger is not likely to slip the threads unless necessary, such as if the func-eval did not complete soon enough and had to be aborted in which case slipping may be tried. The debugger may allow all threads in the process snapshot to execute (slip) during a func-eval in order to avoid deadlocking the debuggee process when inter-thread dependencies are encountered.

The debugger may also use a lightweight machine snapshot of the real debuggee machine and perform func-evals against that machine snapshot to further isolate kernel side effects and other more global side effects, such as file writes. The debugger may use lightweight machine snapshots of a debuggee machine and allow all threads in a target process to execute (slip) during a func-eval in order to avoid deadlocking the debuggee machine when inter-thread dependencies are encountered. The debugger may use the lightweight machine snapshots to isolate side-effects of func-evals. The debugger creates new lightweight machine snapshots when a func-eval side effect no longer reflects the original process or a snapshot becomes so corrupt it can no longer be used.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
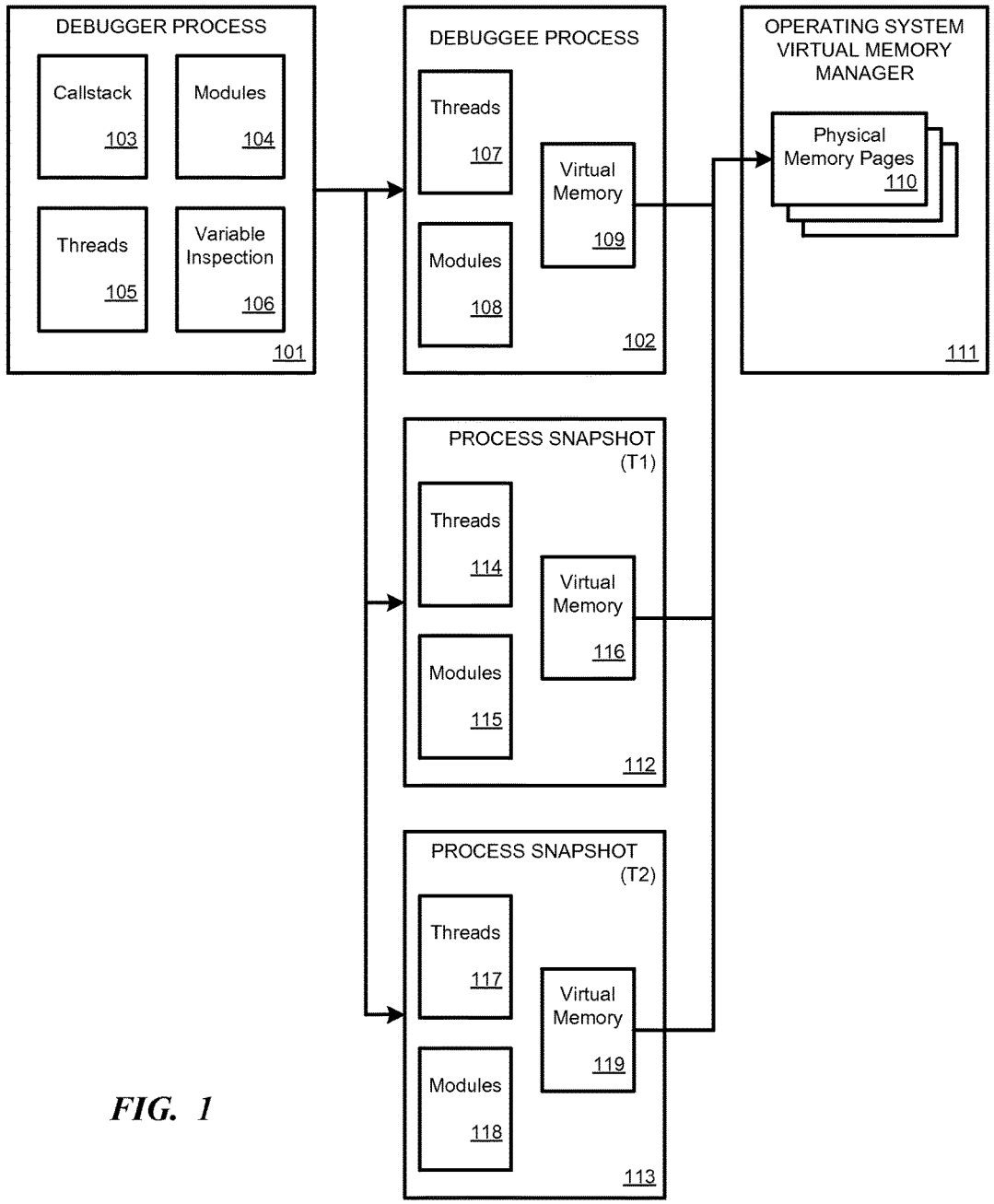
FIG. 1 illustrates historical debugging with lightweight process snapshots.

Function evaluation (func-eval) is the preferred mechanism for modern debuggers to inspect debuggee state. It allows the original abstraction intended by the API author to exactly match the state the developer sees in the debugger. However, as described above, func-eval has several drawbacks including side-effects, deadlocks, and debuggee corruption.

A debugging and diagnostics system allows users to take lightweight process snapshots of live debuggee processes so the users may analyze those snapshots at a later time. The debugging and memory diagnostics system may be used in production scenarios because it minimizes disruption to the production system while still allowing the user to capture snapshots of process states. The lightweight process snapshots enable inspection of a process's callstacks, variable values, memory, module list, thread list and the like while allowing the original process to continue executing.

The snapshot mechanism allows diagnostic tools to compare an original process to one or more process snapshots or to compare any of a series of process snapshots to each other. The snapshot mechanism further allows users to inspect a snapshot of process memory while allowing the original process to continue running with minimal impact.

The term lightweight process snapshot or "snapshot" as used herein refers to a copy of a process that can be created efficiently without needing to create a full trace of the process's execution or memory. In a typical embodiment, an operating system implements the snapshot mechanism on top of a virtual memory model and uses shared memory pages and copy-on-write techniques to avoid the need to create a complete copy of the process. Copy-on-write allows the operating system to map the actual pages of the entire address space of the original process into a second process snapshot quickly. To provide a higher level of isolation, the process snapshot may be created using a virtual machine such as Microsoft Corporation's Drawbridge picoprocess, which is a lightweight, secure isolation container that may run the lightweight process snapshot.

Using lightweight process snapshots or lightweight machine snapshots, as described herein, a debugger may avoid these problems by running full func-evals against the process snapshot of the real debuggee process or against a virtual machine based snapshot of the entire machine the debuggee is running on. These snapshots may be discarded and/or recreated whenever necessary.

Embodiments create lightweight process snapshots or create lightweight machine snapshots to enable function evaluation in a debugger inspection without risk of corrupting or deadlocking the debuggee process and while minimizing the side-effects of doing inspection. A lightweight process snapshot, also referred to herein as a process snapshot, is a copy of the process that is created efficiently without needing to create a full trace of the process's execution or memory. Typically, an operating system implements a snapshot mechanism on top of its virtual memory model and uses shared memory pages and copy-on-write techniques to avoid creating a complete copy of the process. Instead, copy-on-write allows the operating system to map the actual pages of the entire address space of the original process into a second process snapshot quickly. After the snapshot is created, any memory writes to either process cause a copy of that corresponding memory page to be created for the process doing the writing. Thus, side-effect isolation is achieved for memory writes.

A debugger using the func-eval based inspection model against lightweight process snapshots applies the following algorithm:

First, when a debugger enters break mode, the debugger asks the operating system to create a new lightweight snapshot of the original process. This snapshot must accurately reflect the original process, including mapping the debuggee process memory via copy-on-write, duplication of threads within the process, duplication of any handles within the process, and loading of same modules in the process. The debugger must be able to execute code within the process snapshot in order to perform a func-eval.

Second, when the debugger needs to perform a func-eval, it does so within the lightweight process snapshot process, not within the original process. This provides the same results as if the func-eval was run against the original because the snapshot is a clone of the original process and, therefore, doing a func-eval within the process snapshot will be identical to doing a func-eval within the original debuggee process.

It is noted that some side-effects may not be isolated using this model depending on the level of duplication the operating system supports. For example, side effects to external entities, such as file writes during a func-eval, will actually occur. Furthermore, if the operating system is not capable of duplicating the full process, side-effects to anything that is not duplicated, such as shared kernel objects, could actually affect the original process Third, when performing a func-eval within the snapshot process, the debugger may choose to slip all threads in the real debuggee process. That allows all threads in the real debuggee process to execute. This reduces the likelihood of deadlocking the debuggee process if it were to make calls across distributed environments such as COM apartment boundaries or to allow locks to be released that may be held by other threads. If the debugger does an evaluation that allows for threads to slip, the debugger will need to create a new snapshot of the original process after the evaluation is completes. This is necessary because the state of the process snapshot will have changed significantly after the evaluation and may no longer be an accurate representation of the current real debuggee process.

Fourth, when a func-eval in the process snapshot goes wrong—e.g., it times out because of a deadlocked func-eval, or there are obvious side effects from previous evaluations that the developer wishes to undo—a debugger may simply delete the old snapshot and create a new one. The new process snapshot is once again a duplicate of the original process.

In some cases, the debugger will know to create a new process snapshot automatically. For example, the debugger will always need to create a new process snapshot when it enters break mode after being in run mode. This is needed because the debuggee state will likely have changed drastically between break states. However, there are times when the user may need to force the creation of a new snapshot. This may be enabled through the debugger user interface.

FIG. 1 illustrates historical debugging with lightweight process snapshots. A debugger process 101 is used to debug the debuggee process 102. The debugger process 101 has a user interface that allows the user to analyze components of the debuggee process. For example, the user interface may provide windows showing callstack 103, modules 104, threads 105, and variable inspection 106. The debuggee process 102 comprises, for example, threads 107, modules 108, and a virtual memory page table 109. Virtual memory 109 points to physical memory pages 110 that are managed by the operating system's virtual memory manager 111.

During the debug session lightweight process snapshots 112 and 113 are created. These are snapshots of the debuggee process 102 taken at a specific time. The snapshots 112, 113 may be manually initiated by the user, or the debugger 101 may automatically generate the snapshots 112, 113 when a particular event or trigger is observed or at certain intervals.

Snapshot 112 comprises a thread table 114 and modules table 115, which are copies of debugger 101's internal tables at the time (T1) that snapshot 112 was created. Virtual memory page table 116 points to the physical memory pages 110 that were in use at time T1 when snapshot 112 was created. Initially, virtual memory 109 and virtual memory 116 will be identical; however, as debuggee process continues to run virtual memory 109 will change as its page table points to updated memory locations 110.

Similarly, at another time (T2), process snapshot 113 is created in response to a user selection or the occurrence of an event or trigger observed by the debugger process 101. Snapshot 113 includes copies of thread table 117 and modules table 118 at time T2 when the snapshot was created along with a copy of the then-current virtual memory page table 119.

Snapshots 112, 113 allow the debugger process 101 or the user to look back at what debuggee process 102 looked like at the time (T1, T2) when snapshots 112, 113 were created even though debuggee process 102 has changed in the meantime. Also, the debugger process can compare states between and among debuggee process 102 and/or process snapshots 112, 113 to generate differentials between the different process states at different times so that the user can see what part of the process has changed and how.

In other embodiments, a snapshot 112 may be created and the original debuggee process 102 may be allowed to run without interference. Tests may then be run against process snapshot 112 to observe how the process is affected. If process snapshot 112 fails or has other problems due to the tests, then those problems will not affect the real running process 102.

Figure 2:
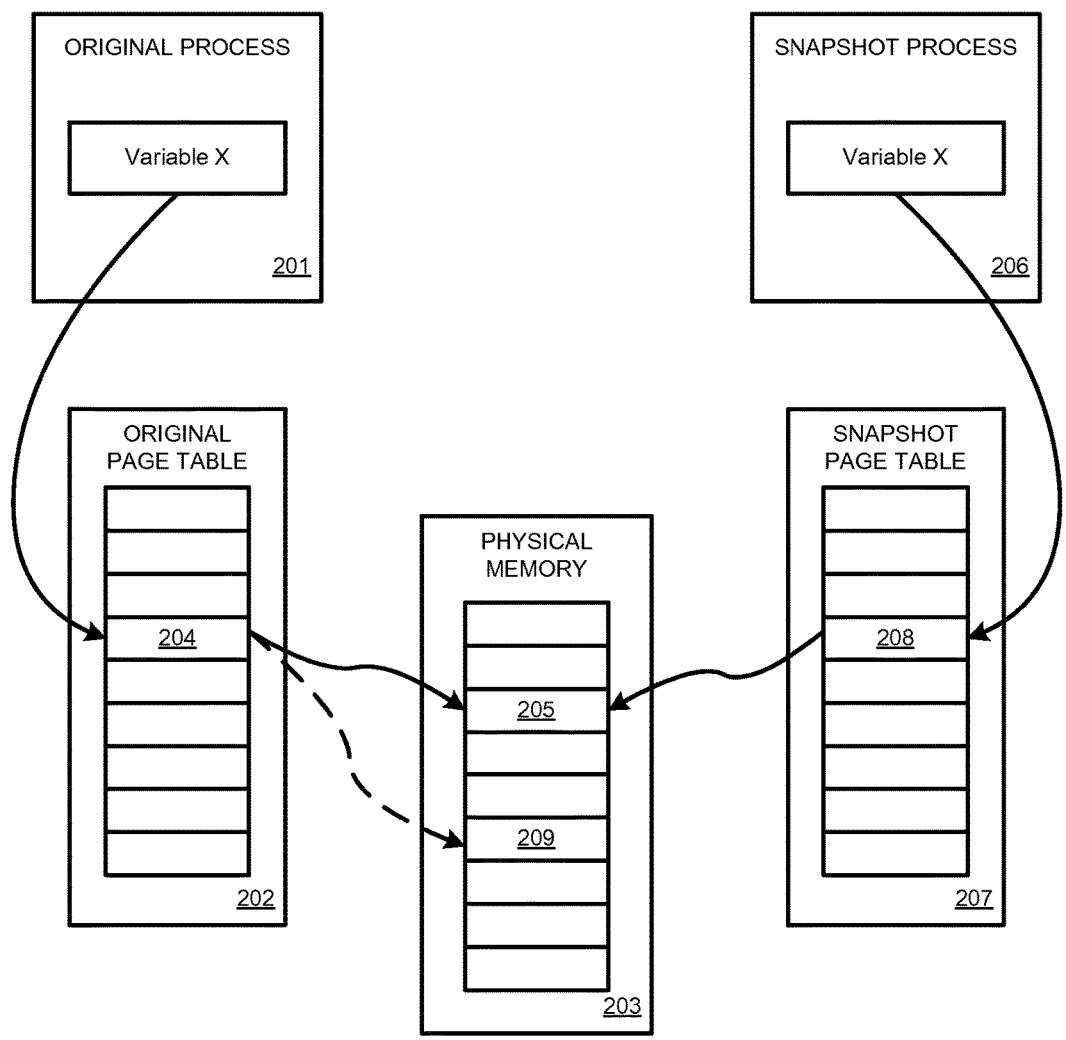
FIG. 2 illustrates a lightweight process snapshot according to one embodiment.

FIG. 2 illustrates a lightweight process snapshot according to one embodiment. Original process 201 includes a page table 202 that points to data stored in physical memory 203. For example, process 201 may store a variable X in page table entry 204, which points to a physical memory location 205 where the value for variable X is actually stored.

When process snapshot 206 is created from original process 201, original page table 202 is copied as snapshot page table 207. The content of snapshot page table 207 is the same as the content of original page table 202 as it existed at the time the snapshot was created. For example, in process snapshot 206, variable X points to an entry 208 in snapshot page table 207, which—like original page table 202—points to physical memory location 205 where the value for variable X is stored.

Original process 201 may continue to run after the snapshot is created. The original process may generate a new value for variable X, which is again stored in entry 204 of original page table 202. However, the new value for variable X is stored in physical memory 203 in a new location 209. Accordingly, original page table 202 is updated to point to physical memory location 209, but snapshot page table 207 maintains its snapshot state and points to memory location 205 where the original value of variable X still resides.

The snapshot mechanism allows for a less destructive debug inspection. Typically when in break mode while debugging a process, the debuggee process is halted by the operating system. This means code within the debuggee process does not execute. This is ideal for inspecting the debuggee state because that state cannot change while the process is halted. However, in some scenarios, halting the process can lead to dead-locks or other system instability. For example, when the debuggee process is shared among other processes, the other processes may attempt to communicate with the shared debuggee process while in break mode. This can lead to delays in other processes in the best case and deadlocks, process corruption, and instability in the worst case. The lightweight snapshot model enables debugging in such scenarios by allowing the debugger to inspect a lightweight process snapshot of the shared process rather than the real process. The real process is allowed to continue execution during this inspection.

Figure 3:
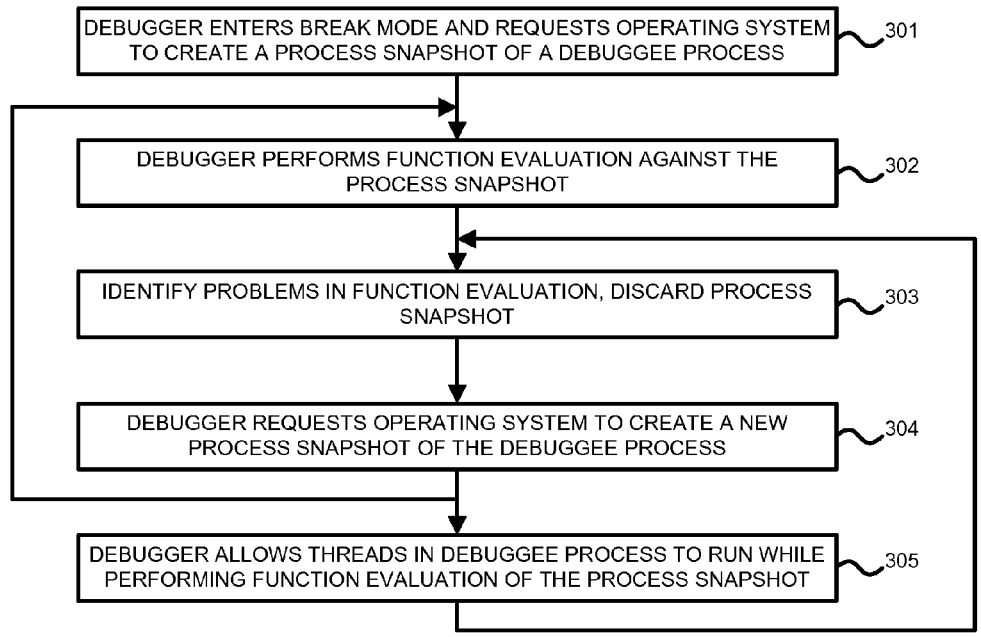
FIG. 3 is a flowchart illustrating a method for performing function evaluations against lightweight process snapshots according to one embodiment.

FIG. 3 is a flowchart illustrating a method for performing function evaluations against lightweight process snapshots according to one embodiment. In step 301, the debugger enters break mode while debugging a debuggee process. The debugger requests the operating system to create a process snapshot of the debuggee process. In step 302, the debugger performs a function evaluation against the process snapshot. The debugger may perform multiple function evaluations against the process by cycling back to step 302. If the debugger identifies problems in the function evaluation it moves to step 303 and discards the process snapshot.

In step 304, the debugger requests the operating system to create a new process snapshot of the debuggee process. The process returns to step 302 to perform additional function evaluations against the new process snapshot. Then the debugger may again perform a functional evaluation of the new process snapshot by returning to step 302. Alternatively, in step 305, the debugger may slip the threads in the debuggee process while performing the functional evaluation of the new process snapshot. If the function evaluation fails or problems such as a deadlock are encountered, then the process returns to step 303 to discard the deadlocked process snapshot and to step 304 to create another new process snapshot.

It will be understood that steps 301-305 of the process illustrated in FIG. 3 may be executed simultaneously and/or sequentially. It will be further understood that each step may be performed in any order and may be performed once or repetitiously.

Figure 4:
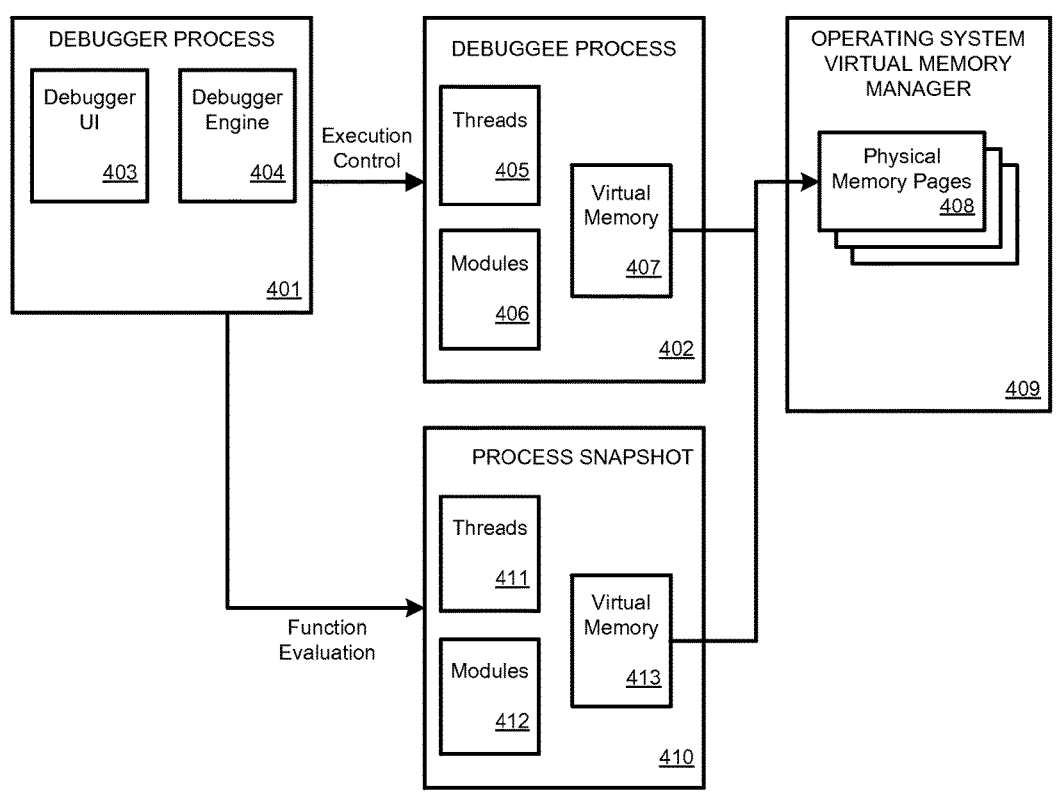
FIG. 4 illustrates a debugger performing a function evaluation against a lightweight process snapshot while allowing the real debuggee process to continue running according to one embodiment.

FIG. 4 illustrates a debugger performing a function evaluation against a lightweight process snapshot while allowing the real debuggee process to continue running according to one embodiment. A debugger process 401 is used to debug the debuggee process 402. The debugger process 401 has a user interface 403 and debugger engine 404 that allow the user to interact with and analyze components of the debuggee process. For example, the user interface may provide windows showing callstacks, modules, threads, and variable values. The debuggee process 502 comprises, for example, threads 405, modules 406, and a virtual memory page table 407. Virtual memory 407 points to physical memory pages 408 that are managed by the operating system's virtual memory manager 409.

Debugger process 401 controls the execution of debuggee process 402 and may suspend the process or allow the process to run. When the user wants to perform a function evaluation on the debuggee process, debugger process 401 requests the operating system to create a lightweight process snapshot 410 of debuggee process 402. Snapshot 410 comprises a thread table 411 and modules table 412, which are copies of the thread and module lists on debuggee process 402 when snapshot 410 was created. Virtual memory page table 413 points to the physical memory pages 408 in use when snapshot 410 is created. Initially, virtual memory 413 and virtual memory 407 will be identical.

The debugger process 401 then performs the function evaluation against process snapshot 410 while slipping the threads on debuggee process 402. If process snapshot 410 fails or has other problems due to the function evaluation, then those problems will not affect the real debuggee process 402. If problems occur, debugger process 401 can discard process snapshot 410 and request the operating system to create a new process snapshot.

In the case where the operating system supports creating, booting, and restoring virtual machines, the debugger may generate a new virtual machine that contains a complete copy of the machine that is running the debuggee process. The debugger can then perform the func-eval against a process snapshot that is running on the virtual machine. This will allow for a fully isolated external state, such as kernel handles, and file writes. The virtual machine may be created, for example, using Microsoft Corporation's Drawbridge picoprocess to create a lightweight virtual machine in which the operating system implementation resides within the debuggee process, which allows the kernel state to be isolated.

A debugger may use virtual machine technology to perform the func-eval against an entire copy of the machine that is running the debuggee process instead of just against a process snapshot. This enables isolating kernel mode side-effects as well as external side effects, such as file writes, that would be impossible to isolate using only a process snapshot. This model is referred to herein as a "machine snapshot." This model requires an extremely fast virtual machine technology that supports creating, booting, and rolling back a virtual machine very quickly. One such emerging technology is Microsoft Corporation's Drawbridge virtual machine model.

As used herein, the lightweight machine snapshot encompasses a broad range of copies of the host machine and debuggee process requiring varying amounts of isolation and host machine data. In one embodiment, the lightweight machine snapshot is a full snapshot or copy of the debuggee host machine. In other implementations, the machine snapshot may be a copy of the debuggee process and most of the kernel, but nothing else on the system. Other implementations may use: just a snapshot of a single debuggee process, a process snapshot with kernel state, everything on the debuggee machine, or multiple host machines.

Figure 5:
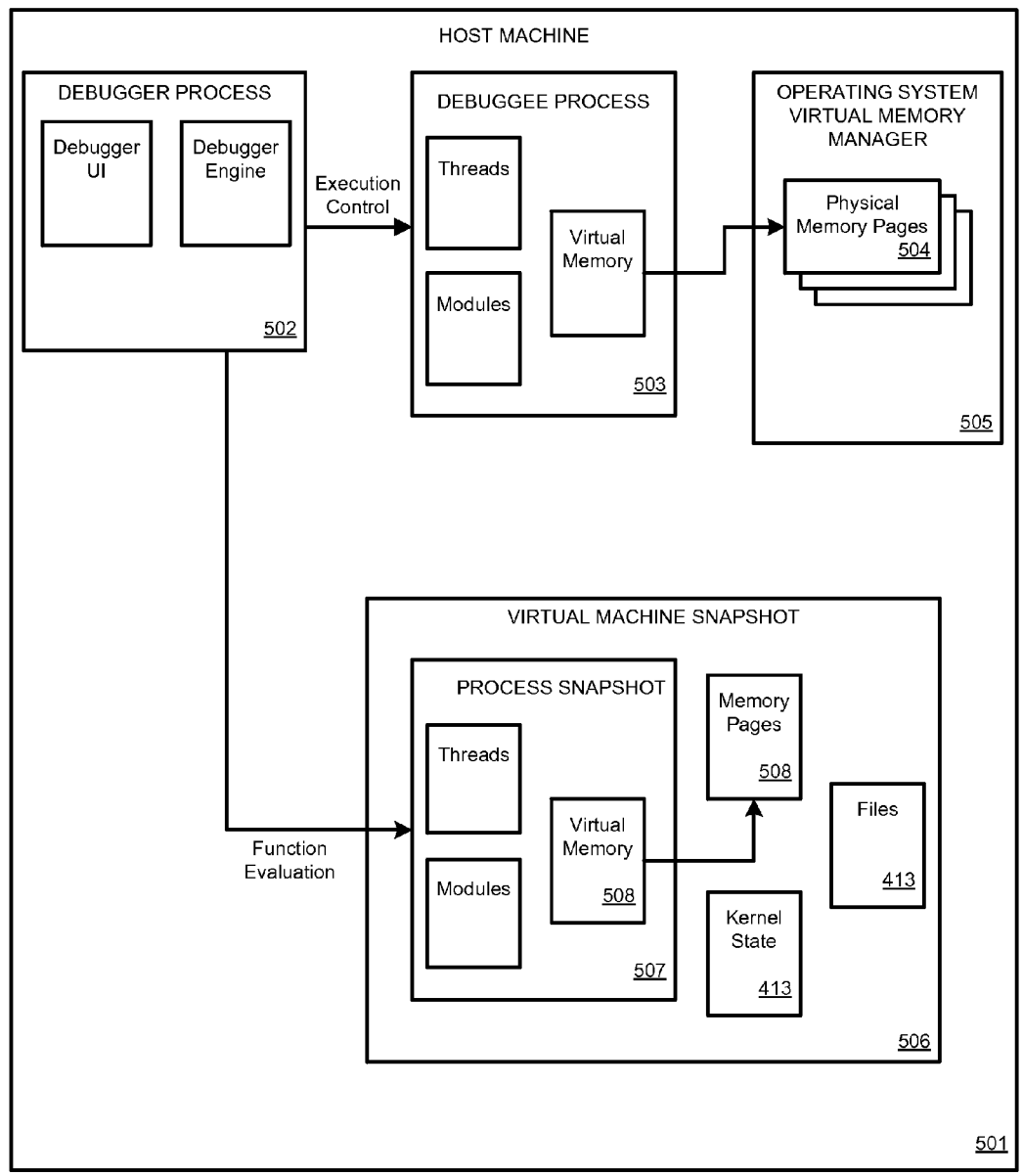
FIG. 5 illustrates a debugger performing a function evaluation against a lightweight machine snapshot while allowing the real debuggee process to continue running on the host machine according to one embodiment.

FIG. 5 illustrates a debugger performing a function evaluation against a lightweight machine snapshot while allowing the real debuggee process to continue running on the host machine according to one embodiment. Host machine 501 is running debugger process 502, which is used to debug the debuggee process 503 also running on host machine 501. A user interface and debugger engine on debugger process 501 allow the user to interact with and analyze components of the debuggee process 503. Virtual memory in debuggee process 503 points to physical memory pages 504 that are managed by the operating system's virtual memory manager 505.

Debugger process 502 controls the execution of debuggee process 503 and may suspend the process or allow the process to run. When the user wants to perform a function evaluation on the debuggee process, debugger process 502 requests the operating system to create a virtual machine snapshot 506.

Virtual machine snapshot 506 is complete copy of the host machine 501 that is running debuggee process 503. Virtual machine snapshot 506 includes a process snapshot 507, which is a complete copy of debuggee process 503 at the time the virtual machine snapshot was created. Process snapshot 506 comprises thread table modules tables that are copies of the thread and module lists on debuggee process 503 when machine snapshot 506 was created. Virtual memory page table 507 does not point to the physical memory pages 504 in the host machine memory, but instead points to memory pages 508 on the virtual machine. The virtual machine snapshot also includes a kernel state 509 and files 510 copied from the host machine 501.

The debugger process 502 performs the function evaluation against virtual machine snapshot 506 while slipping the threads on debuggee process 503. If machine snapshot 506 fails or has other problems due to the function evaluation, then those problems will not affect the real debuggee process 503 or any other process running on host machine 501. Any kernel mode side-effects or external side effects, such as file writes, are isolated to virtual machine snapshot 506. If problems occur, debugger process 502 can discard machine snapshot 506 and request the operating system to create a new machine snapshot.

Figure 6:
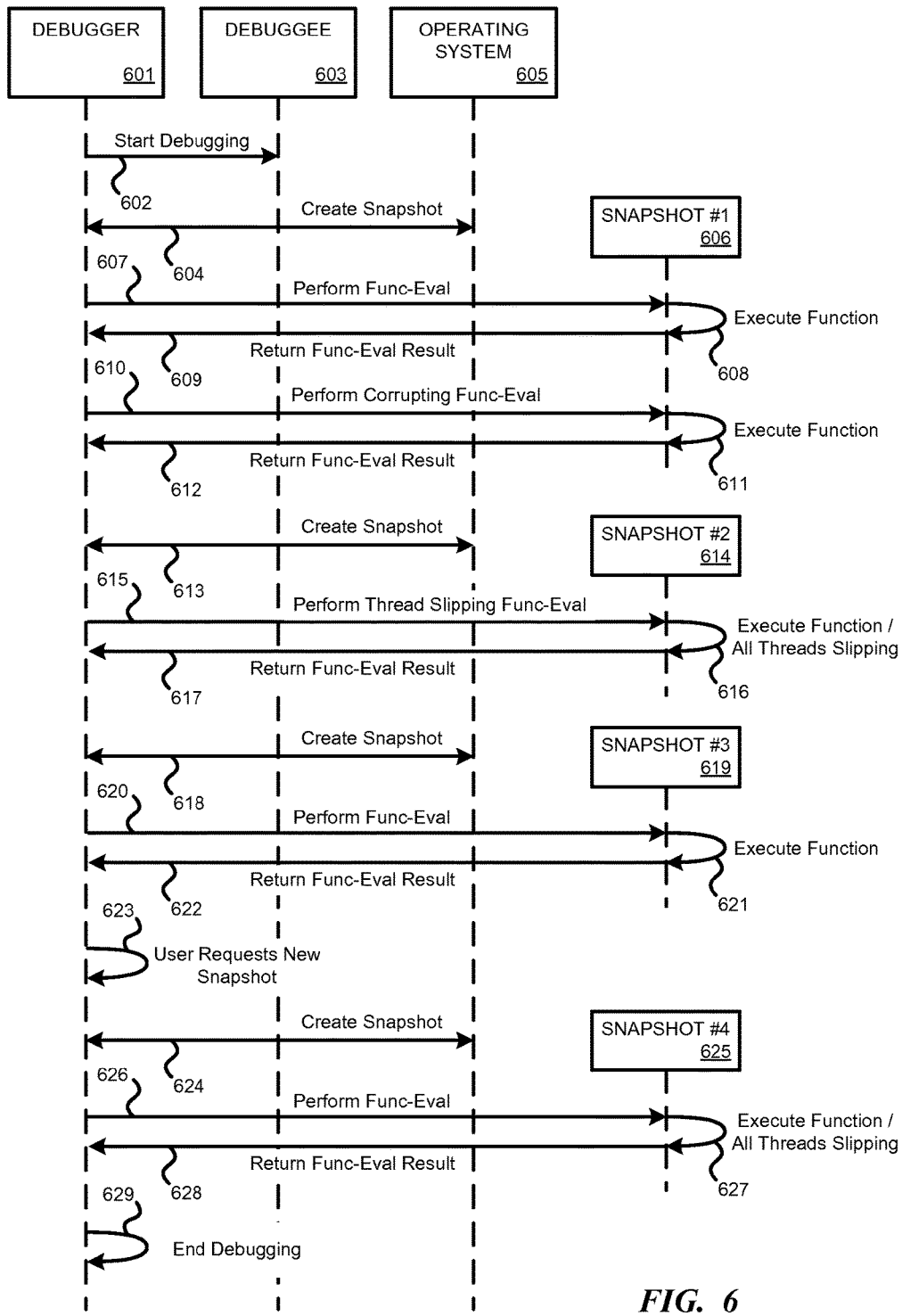
FIG. 6 illustrates an in-process debugging session using lightweight process snapshots.

FIG. 6 illustrates an in-process debugging session using lightweight process snapshots. Debugger process 601 initiates a debugging session (602) with debuggee process 603. Debugger 601 requests (604) operating system 605 to create a first process snapshot 606 of debuggee 603.

Debugger 601 performs func-eval (607) on process snapshot 606, which executes the function (608) and returns results (609).

Debugger 601 then performs a corrupting func-eval (610) on process snapshot 606, which executes the function (611) and returns results (612). Process snapshot 606 is corrupted after executing the function (611). So debugger 601 discards process snapshot 606 and requests (613) operating system 605 to create a second process snapshot 614.

After performing the func-evals 608 and 611 without slipping, debugger 601 creates second process snapshot 614 after first process snapshot 606 deadlocks. Debugger 601 then performs thread slipping func-eval (615) on process snapshot 614, which executes the function (616) while all threads are slipping in debuggee process 602. Snapshot process 614 returns results (617). Because all threads in debuggee process 603 were slipping while snapshot process 614 executed the function, snapshot process 614 is no longer an accurate copy of debuggee process 603. Accordingly, debugger 601 discards process snapshot 614 and requests (618) operating system 605 to create a third process snapshot 619.

Debugger 601 then performs func-eval (620) on process snapshot 619, which executes the function (621) and returns results (622). The user may direct (623) the debugger 601 to discard the process snapshot 619 and create a new snapshot. Debugger 601 then discards process snapshot 619 and requests (624) operating system 605 to create a fourth process snapshot 625.

Debugger 601 performs thread slipping func-eval (626) on process snapshot 625, which executes the function (627) while all threads are slipping in debuggee process 602. Snapshot process 625 returns results (628).

The debugger 601 ends debugging (629) when func-eval is complete.

If operating system 605 supports creation of virtual machine snapshots, then process snapshots 606, 614, 609, and 625 may be replaced with lightweight machine snapshots to further protect and isolate debuggee 603.

Figure 7:
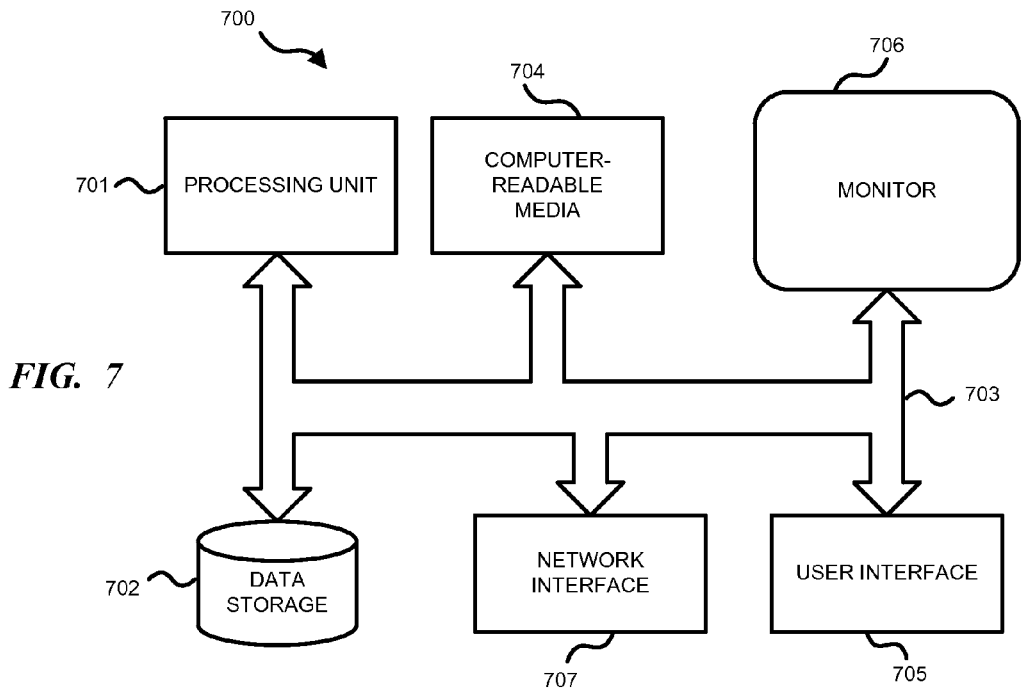
FIG. 7 illustrates an example of a suitable computing and networking environment for in-process debugging using lightweight process snapshots.

FIG. 7 illustrates an example of a suitable computing and networking environment 700 on which the examples of FIGS. 1-6 may be implemented for in-process debugging using lightweight process snapshots. The computing system environment 700 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 700. Components may include, but are not limited to, various hardware components, such as processing unit 701, data storage 702, such as a system memory, and system bus 703 that couples various system components including the data storage 702 to the processing unit 701. The system bus 703 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 700 typically includes a variety of computer-readable media 704. Computer-readable media 704 may be any available media that can be accessed by the computer 700 and includes both volatile and nonvolatile media, and removable and non-removable media, but excludes propagated signals. By way of example, and not limitation, computer-readable media 704 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 702 includes computer storage media in the form of volatile and/or nonvolatile memory such as read only memory (ROM) and random access memory (RAM). A basic input/output system (BIOS), containing the basic routines that help to transfer information between elements within computer 700, such as during start-up, is typically stored in ROM. RAM typically contains data and/or program modules that are immediately accessible to and/or presently being operated on by processing unit 701. By way of example, and not limitation, data storage 702 holds an operating system, application programs, and other program modules and program data.

Data storage 702 may also include other removable/non-removable, volatile/nonvolatile computer storage media. By way of example only, data storage 702 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 7, provide storage of computer-readable instructions, data structures, program modules and other data for the computer 700.

A user may enter commands and information through a user interface 705 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 701 through a user input interface 705 that is coupled to the system bus 703, but may be connected by other interface and bus structures, such as a parallel port, game port or a universal serial bus (USB). A monitor 706 or other type of display device is also connected to the system bus 703 via an interface, such as a video interface. The monitor 706 may also be integrated with a touch-screen panel or the like. Note that the monitor and/or touch screen panel can be physically coupled to a housing in which the computing device 700 is incorporated, such as in a tablet-type personal computer. In addition, computers such as the computing device 700 may also include other peripheral output devices such as speakers and printer, which may be connected through an output peripheral interface or the like.

The computer 700 may operate in a networked or cloud-computing environment using logical connections 707 to one or more remote devices, such as a remote computer. The remote computer may be a personal computer, a server, a router, a network PC, a peer device or other common network node, and typically includes many or all of the elements described above relative to the computer 700. The logical connections depicted in FIG. 7 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 700 may be connected to a public or private network through a network interface or adapter 707. In some embodiments, a modem or other means for establishing communications over the network. The modem, which may be internal or external, may be connected to the system bus 703 via the network interface 707 or other appropriate mechanism. A wireless networking component such as comprising an interface and antenna may be coupled through a suitable device such as an access point or peer computer to a network. In a networked environment, program modules depicted relative to the computer 700, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   entering a break mode while in-process debugging a target process, wherein the target process is executed using a virtual memory that points to a physical memory;
   generating a first lightweight process snapshot from the target process, wherein the lightweight process snapshot utilizes a copy of the virtual memory utilized by the target process, wherein the copy points to the physical memory;
   performing a function evaluation against the first lightweight process snapshot;
   detecting a failure while performing the function evaluation;
   generating a second lightweight process snapshot from the target process; and
   performing function evaluation against the second lightweight process snapshot while allowing all threads to execute during the function evaluation.

2. The computer-implemented method of claim 1, wherein detecting the failure comprises:
   determining that the first lightweight process snapshot no longer represents the target process because the first lightweight process snapshot has been corrupted.

3. The computer-implemented method of claim 1, wherein detecting the failure comprises:
   detecting a deadlock while performing the function evaluation.

4. The computer-implemented method of claim 3, wherein the threads in the target process are allowed to execute to avoid deadlocking the target process when inter-thread dependencies are encountered.

5. The computer-implemented method of claim 1, further comprising:
   allowing all threads in the lightweight snapshot process to execute during the function evaluation to avoid deadlocking the snapshot process.

6. The computer-implemented method of claim 1, further comprising:
   creating a lightweight machine snapshot of a machine hosting the target process;
   running the lightweight process snapshot on the lightweight machine snapshot; and
   performing the function evaluation against the lightweight process snapshot that is running on the lightweight machine snapshot.

7. The computer-implemented method of claim 6, further comprising:
   allowing all threads in the target process to execute during the function evaluation to avoid deadlocking the target process when inter-thread dependencies are encountered.

8. The computer-implemented method of claim 6, wherein side effects of the function evaluation on the lightweight machine snapshot are isolated from the target process and from the target process's kernel.

9. The computer-implemented method of claim 6, further comprising:
   identifying when the lightweight process snapshot no longer represents the target process due to side effects of the function evaluation; and
   creating a new lightweight machine snapshot.

10. The computer-implemented method of claim 1, further comprising:
    identifying when the lightweight process snapshot has been corrupted and no longer represents the target process; and
    creating a new lightweight machine snapshot.

11. A system, comprising:
    a processor; and
    a memory coupled to the processor, the memory having program instructions stored thereon that, upon execution by the processor, cause the system to:
        enter a break mode while in-process debugging a target process, wherein the target process is executed using a virtual memory that points to a physical memory;
        generate a first lightweight process snapshot from the target process, wherein the lightweight process snapshot utilizes a copy of the virtual memory utilized by the target process, wherein the copy points to the physical memory; and
        perform a function evaluation against the first lightweight process snapshot;
        detect a failure while performing the function evaluation;
        generate a second lightweight process snapshot from the target process; and
        perform function evaluation against the second lightweight process snapshot while allowing all threads to execute during the function evaluation.

12. The system of claim 11, wherein the program instructions, upon execution by the processor, further cause the system to:
    allow all threads in the target process to execute during the function evaluation to avoid deadlocking the target process when inter-thread dependencies are encountered.

13. The system of claim 11, wherein the program instructions, upon execution by the processor, further cause the system to:
    detect the failure by identifying that the first lightweight process snapshot has been corrupted or by detecting a deadlock while performing the function evaluation.

14. The system of claim 11, wherein the program instructions, upon execution by the processor, further cause the system to:
    create a lightweight machine snapshot of a machine hosting the target process;
    run the lightweight process snapshot on the lightweight machine snapshot; and
    perform the function evaluation against the lightweight process snapshot that is running on the lightweight machine snapshot.

15. The system of claim 14, wherein side effects of the function evaluation on the lightweight machine snapshot are isolated from the target process.

16. A device comprising a computer readable medium having program instructions stored thereon that, upon execution by one or more processors of a computer system, cause the computer system to:
    enter a break mode while in-process debugging a target process, wherein the target process is executed using a virtual memory that points to a physical memory;
    generate a first lightweight process snapshot from the target process, wherein the first lightweight process snapshot utilizes a copy of the virtual memory utilized by the target process, wherein the copy points to the physical memory;
    perform a function evaluation against the lightweight process snapshot
    detect a failure while performing the function evaluation;
    generate a second lightweight process snapshot from the target process; and
    perform function evaluation against the second lightweight process snapshot while allowing all threads to execute during the function evaluation.

17. The device of claim 16, wherein the program instructions, upon execution by the one or more processors, further cause the computer system to:
    allow all threads in the target process to execute during the function evaluation to avoid deadlocking the target process when inter-thread dependencies are encountered.

18. The device of claim 16, wherein the program instructions, upon execution by the one or more processors, further cause the computer system to:
    create a lightweight machine snapshot of a machine hosting the target process;
    run the lightweight process snapshot on the lightweight machine snapshot; and
    perform the function evaluation against the lightweight process snapshot that is running on the lightweight machine snapshot and isolated from the target process and the target process's kernel.

* * * * *